United States Patent
Ojo et al.

(10) Patent No.: US 6,596,256 B1
(45) Date of Patent: Jul. 22, 2003

(54) SYNTHESIS OF LOW SILICON SODIUM X ZEOLITE

(75) Inventors: Adeola F. Ojo, Scotch Plains, NJ (US); Frank R. Fitch, Bedminster, NJ (US); Martin Bülow, Basking Ridge, NJ (US); Craig S. Gittleman, Brighton, NY (US); Sudhakar R. Jale, Scotch Plains, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/648,798

(22) Filed: Aug. 28, 2000

(51) Int. Cl.$^7$ .............................................. C01B 39/22
(52) U.S. Cl. ................. 423/700; 423/716; 423/DIG. 21
(58) Field of Search ................................ 423/700, 716, 423/DIG. 21

(56) References Cited

U.S. PATENT DOCUMENTS

| | | |
|---|---|---|
| 2,882,243 A | 4/1959 | Milton |
| 2,882,244 A | 4/1959 | Milton |
| 2,996,358 A | 8/1961 | Milton |
| 3,012,853 A | 12/1961 | Milton |
| 3,503,901 A | 3/1970 | Pickert |
| 3,576,901 A | 4/1971 | Kokotailo et al. |
| 3,723,308 A | 3/1973 | Breck |
| 3,732,326 A | 5/1973 | Chen |
| 3,773,690 A | 11/1973 | Heinze et al. |
| 3,885,927 A | 5/1975 | Sherman et al |
| 3,985,859 A | 10/1976 | Blaine |
| 4,122,007 A | 10/1978 | Yamamoto et al. |
| 4,173,622 A | 11/1979 | Robertson |
| 4,303,629 A | 12/1981 | Strack et al. |
| 4,443,422 A | 4/1984 | Kostinko |
| 4,456,482 A * | 6/1984 | Marosi et al. |
| 4,556,550 A | 12/1985 | Ross et al. |
| 4,603,040 A | 7/1986 | Kuznicki et al. |
| 4,606,899 A | 8/1986 | Butter et al. |
| 4,775,396 A | 10/1988 | Rastelli et al. |
| 4,913,850 A | 4/1990 | Puppe et al. |
| 5,075,084 A | 12/1991 | Wilhelm et al. |
| 5,152,813 A | 10/1992 | Coe et al. |
| 5,173,462 A | 12/1992 | Plee |
| 5,174,979 A | 12/1992 | Chao et al. |
| 5,354,360 A | 10/1994 | Coe et al. |
| 5,413,625 A | 5/1995 | Chao et al. |
| 5,425,933 A * | 6/1995 | Nakagawa ................... 423/706 |
| 5,464,467 A | 11/1995 | Fitch et al. |
| 5,531,808 A | 7/1996 | Ojo et al. |
| 5,554,356 A * | 9/1996 | Saxton et al. ................ 423/706 |
| 5,562,756 A | 10/1996 | Coe et al. |
| 5,567,407 A | 10/1996 | Coe et al. |
| 5,656,064 A | 8/1997 | Golden et al. |
| 5,779,766 A | 7/1998 | Weigel et al. |
| 5,779,767 A | 7/1998 | Golden et al. |
| 5,882,625 A | 3/1999 | Mac Dougall et al. |
| 5,908,823 A | 6/1999 | Zatta et al. |
| 5,916,836 A | 6/1999 | Toufar et al. |
| 5,928,623 A * | 7/1999 | Plee et al. .................... 423/711 |
| 5,962,358 A | 10/1999 | Hees et al. |
| 5,993,773 A * | 11/1999 | Funakoshi et al. ........... 423/709 |
| 6,051,051 A | 4/2000 | Hees et al. |
| 6,083,301 A | 7/2000 | Gary et al. |
| 6,106,593 A | 8/2000 | Golden et al. |
| 6,143,057 A | 11/2000 | Bülow et al. |
| 6,306,363 B1 * | 10/2001 | Funakoshi et al. ........... 423/710 |

FOREIGN PATENT DOCUMENTS

| | | |
|---|---|---|
| DE | 43 221 | 11/1965 |
| DE | 2 016 838 | 4/1970 |
| EP | 0 196 103 A2 | 3/1986 |
| EP | 0 995 477 A1 | 4/2000 |
| GB | 1 051 621 | 12/1966 |
| GB | 1 580 928 | 12/1980 |
| JP | 10053410 A * | 2/1998 |
| WO | WO 99/05063 | 2/1999 |

OTHER PUBLICATIONS

M. Tatic and B. Drzaj, Studies In Surface Science And Catalysis, vol. 24 (Zeolites: Synthesis, Structure, Technology and Application), "A Contribution to the Synthesis of the Low–Silica X Zeolite" pp. 129–136, 1985.

Günter H. Kühl, "Crystallization of Low–Silica Faujasite ($SiO_2/Al_2O_3$~2.0)", ZEOLITES, 1987, vol. 7, Sep., pp. 451–457.

C. G. Coe, "Molecularly Engineered Adsorbents for Air Separation," Process Technology Proceedings, vol. 8, 1990, pp. 149–157.

D. W. Breck, W. G. Eversole, R. M. Milton, T. B. Reed and T. L. Thomas, "Crystalline Zeolites. I. The Properties of a New Synthetic Zeolite, Type A," Journal Of The American Chemical Society, vol. 78, Dec. 8, 1956, No. 23, pp. 5963–5977.

* cited by examiner

*Primary Examiner*—David Sample
(74) *Attorney, Agent, or Firm*—Philip H. Von Neida; Salvatore P. Pace

(57) ABSTRACT

Low silicon sodium X zeolite containing little or no sodium A zeolite as by-product, is prepared by direct synthesis from sodium ion-containing hydrogels, the crystallization step being carried out by maintaining the hydrogels at a temperature below about 70° C., and preferably in the range of about 50 to about 70° C. for the duration of the crystallization step. Preferably, the ratios of components in the solutions used to make the hydrogel are such that in the hydrogel the silica/alumina molar ratio will be in the range of about 2.25:1 to about 2.4:1; the sodium oxide to silica molar ratio will be in the range 1.6:1 to about 1.9:1; and the water to sodium oxide molar ratio will be greater than about 60:1.

13 Claims, 1 Drawing Sheet

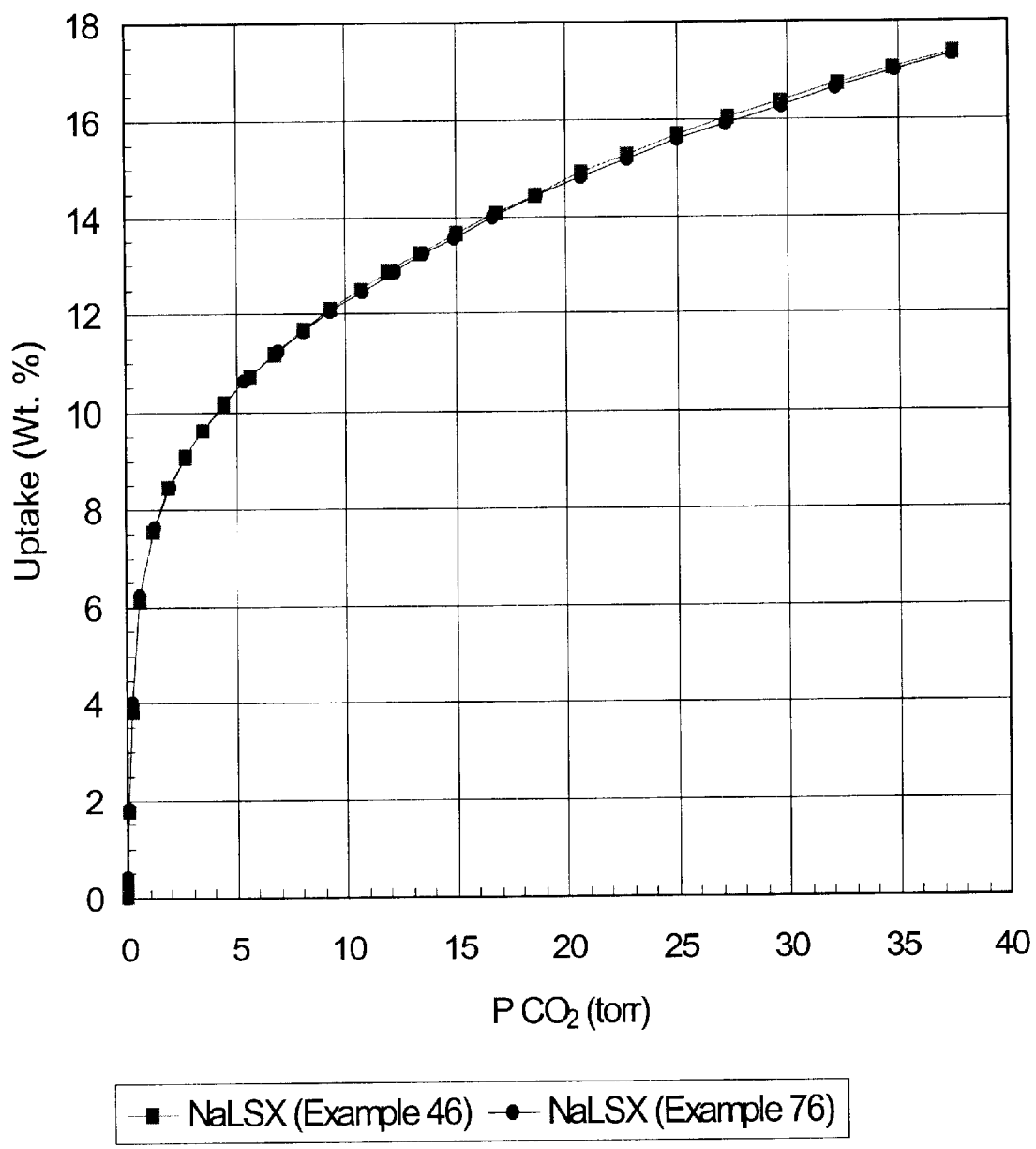
FIGURE

SYNTHESIS OF LOW SILICON SODIUM X ZEOLITE

FIELD OF THE INVENTION

This invention relates to the manufacture of a crystalline aluminosilicate material, and more particularly to the manufacture of low silicon faujasite-type zeolites. Specifically, the invention is directed to the preparation of low silicon sodium X zeolite having a very low concentration of by-product sodium A zeolite.

BACKGROUND OF THE INVENTION

Faujasite-type zeolites are defined as those zeolites with a framework topography resembling the mineral faujasite. Such species are characterized by a relatively open zeolite framework with comparatively large (about 8 Å) micropores and high (nearly 50%) intracrystalline void volumes. Synthetic faujasites are generally subdivided into zeolites X and Y by virtue of their silicon content; zeolite Y being characterized as synthetic faujasite having a Si/Al (silicon/aluminum) atomic ratio of 1.5 and higher, and zeolite X being characterized as synthetic zeolite having a Si/Al atomic ratio <1.5. Type X itself can be further subdivided into low silicon type X (LSX), defined as type X zeolite having a Si/Al atomic ratio of 1.0 to about 1.1, medium silicon type X (MSX), defined as type X zeolite having a Si/Al atomic ratio in the range of >1.1 to about 1.2, and conventional to high silicon type X, defined as type X zeolite having a Si/Al atomic ratio in the range of >1.2 to about 1.5.

Conventionally, sodium zeolite X having Si/Al atomic ratios greater than about 1.2 are prepared by crystallizing a sodium-based aqueous gel at temperatures in the range of about 70 to about 100° C. for several hours. In pioneering work in this field, Milton, in U.S. Pat. Nos. 2,882,243 and 2,882,244, described the preparation of type A and type X zeolites, and the use of these materials to separate gas mixtures such as air into their components.

Many other workers in the field have patented techniques for the preparation of zeolites. For example, Robertson, U.S. Pat. No. 4,173,622, and Strack et al., U.S. Pat. No. 4,303,629, describe the production of type A zeolite, and Kostinko, U.S. Pat. No. 4,443,422, describes the preparation of zeolite A and zeolite X . Kostinko gives a detailed summary of the patent literature in the field of zeolite preparation.

Recently, there has been considerable interest in producing type X zeolites having low Si/Al atomic ratios. Attempts were made to prepare sodium LSX (NaLSX) zeolite by direct synthesis of sodium ion-containing gels; however, the resulting products contained considerable amounts of type A zeolite, which render them unsuitable for many adsorption applications. Tatic, M. et al. in "Zeolites: Synthesis, Structure, Technology and Application", *Studies in Surface Science and Catalysis*, vol. 24, pp.129–136 (1985), describe various methods to directly synthesize NaLSX. In most cases, a significant amount of zeolite A is present in the synthesized products, and they have Si/Al atomic ratios between 1.1 and 1.2.

The above-described problem was eventually overcome when it was discovered that NaLSX with little or no type A zeolite as by-product could be produced by crystallizing the zeolite from a mixed sodium-potassium aqueous gel and then ion-exchanging the zeolite with an aqueous sodium salt, thereby replacing the potassium ions in the product with sodium ions. East German patent 43,221 teaches the production of sodium-potassium zeolite X (Na,K-LSX) by crystallizing a reaction mixture prepared from a sodium aluminate-sodium silicate-sodium hydroxide-potassium hydroxide solution at 50–100° C. for about 7–10 hours. British Pat. No. 1,580,928 describes a procedure for the preparation of Na,K-LSX zeolite wherein aluminosilicate gels are subjected to a multi-day aging period at low temperature, ideally 40° C., followed by crystallization at 60–100° C. at ambient pressure. The principal characteristics of this procedure are that a lengthy aging period is required and the product has significant amounts of potassium ion, the latter characteristic resulting because the process is carried out at a $K_2O/(K_2O+N_2O)$ molar ratio in the range of between 0.10 and 0.40. Accordingly, when it is desired to produce substantially potassium-free NaLSX by this procedure, it is necessary to conduct extensive extra ion exchange steps with sodium salt to replace potassium ion in the as-synthesized powder.

There is a need for an efficient procedure for producing a very low type A zeolite-containing NaLSX by direct crystallization of sodium ion-containing gels. The present invention provides such a procedure.

SUMMARY OF THE INVENTION

According to a first broad embodiment, this invention comprises a method of producing sodium X zeolite comprising the steps:

(a) forming a uniform, substantially potassium ion-free, aqueous reaction mixture comprising silica, alumina and sodium ions, the concentrations of the components in the reaction mixture being such that the silica/alumina molar ratio is in the range of about 2.1:1 to about 3.0:1; the sodium oxide/silica molar ratio is in the range of about 1.2:1 to about 2.5:1; and the water/sodium oxide molar ratio is greater than about 35:1;

(b) maintaining the reaction mixture at a temperature less than about 70° C. until crystallization of the mixture is substantially complete; and (c) recovering from the reaction mixture crystallized sodium X zeolite having a silicon/aluminum atomic ratio in the range of about 1 to less than about 1.2.

In a preferred aspect of the first embodiment, the reaction mixture is maintained at a temperature in the range of about 50 to less than about 70° C. during step (b). In a more preferred aspect, the reaction mixture is maintained at a temperature in the range of about 50 to about 65° C. during step (b).

In another preferred aspect of this embodiment, the silica/alumina molar ratio in the reaction mixture is in the range of about 2.25:1 to about 2.4:1, the sodium oxide/silica molar ratio is in the range of about 1.6:1 to about 1.9:1 and the water/sodium oxide molar ratio is at least about 60:1.

In another preferred aspect of this embodiment, the crystallized sodium X zeolite has a Si/Al atomic ratio in the range of about 1 to about 1.1. In a more preferred aspect of the first embodiment, the crystallized sodium X zeolite has a Si/Al atomic ratio in the range of about 1.03 to about 1.06.

In another preferred aspect of this embodiment the reaction mixture is formed by mixing a first aqueous mixture comprising an alumina source and a second aqueous mixture comprising a silica source. In a more preferred aspect, the first aqueous mixture is an aqueous solution comprising sodium aluminate and the second aqueous mixture is an aqueous solution comprising sodium silicate, sodium metasilicate or mixtures thereof. In a more preferred aspect the first aqueous solution is formed by dispersing sodium aluminate in water and adding sodium hydroxide to the resulting slurry.

In another preferred aspect, the aqueous reaction mixture is vigorously agitated during step (b). In another preferred aspect, the method further comprises drying the recovered crystallized sodium X zeolite at a temperature in the range of about ambient temperature to about 150° C.

In another preferred aspect of the first embodiment, the method further comprises ion-exchanging the crystallized sodium X zeolite with monovalent cations, divalent cations, trivalent cations or mixtures thereof. In a more preferred aspect the crystallized sodium X zeolite is ion exchanged with calcium ions, lithium ions, rare earth cations or mixtures thereof.

A second broad embodiment of the invention comprises the crystallized sodium X zeolite product made by a process of the first embodiment. A preferred aspect of this embodiment comprises the crystallized type X zeolite product made by the process of the first embodiment and ion-exchanged with calcium ions, potassium ions, lithium ions, rare earth cations or mixtures thereof.

A third broad embodiment of the invention comprises a method of purifying a gas comprising subjecting the gas to a cyclic temperature swing adsorption process comprising an adsorption process and an adsorbent regeneration step, the crystallized sodium X zeolite prepared in the first broad embodiment being used as the adsorbent in the process.

In a preferred aspect of the third embodiment, the gas being purified is air containing carbon dioxide and the adsorbent adsorbs carbon dioxide from the air.

In another preferred aspect of this embodiment, the crystallized sodium X zeolite has a Si/Al atomic ratio in the range of about 1 to about 1.1. In a more preferred aspect, the crystallized sodium X zeolite has a Si/Al atomic ratio in the range of about 1.03 to about 1.06.

In another preferred aspect of the third embodiment, the adsorbent regeneration step is carried out at a temperature in the range of about 100 to about 250° C.

A fourth embodiment is the separation of nitrogen from a gas comprising subjecting the gas to a cyclic adsorption process comprising an adsorption step and an adsorbent regeneration step, using as the adsorbent the crystallized type X zeolite product made by the process of the first embodiment and ion-exchanged with calcium ions, lithium ions, rare earth cations or mixtures thereof. Preferably, the gas is air.

In a preferred aspect of the invention, at least 80% by weight of the crystallized sodium X zeolite has a primary particle dimension in the range of about 0.1 to about 15 microns. In a more preferred aspect, this primary particle dimension is in the range of about 0.1 to about 6 microns.

BRIEF DESCRIPTION OF THE DRAWING

The FIGURE shows carbon dioxide equilibrium adsorption isotherms for the NaLSX prepared in Examples 46 and 76.

DETAILED DESCRIPTION OF THE INVENTION

The present invention provides an efficient and low cost method of producing NaLSX, i. e., NaX having a Si/Al atomic ratio in the range of about 1 to about 30 1.1, which corresponds to a $SiO_2/Al_2O_3$ molar ratio in the range of about 2.0 to about 2.2, and NaMSX, i. e., NaX having a Si/Al atomic ratio in the range of greater than about 1.1 to less than about 1.2, which corresponds to a $SiO_2/Al_2O_3$ molar ratio in the range of greater than about 2.2 to less than about 2.4. In particular, the invention provides an improved method of directly synthesizing NaX having a Si/Al atomic ratio in the range of about 1 to about 1.09, with very little or no formation of NaA zeolite by-product.

In general, the method of the invention comprises directly synthesizing NaLSX from an aqueous reaction mixture containing sources of alumina, silica and sodium ions. The reaction mixture, which is usually in the form of a hydrogel, may be formed from a solution, suspension or emulsion of the reactants. The sources of alumina, silica and sodium ions are preferably those that will not introduce undesired ions into the system. Preferred alumina sources include sodium aluminate and hydrated aluminum hydroxide; preferred silica sources include silica sols, the various silicates, such as sodium silicate and hydrated sodium metasilicate; and preferred sodium ion sources include sodium hydroxide. The reaction mixture can be formed by any suitable method. A typical procedure comprises combining, at the desired temperature, aqueous systems, e. g., aqueous solutions or suspensions, of aluminate ions and silica in ratios that will produce a hydrogel. The reaction mixture is then maintained at a temperature that will produce the desired sodium X zeolite for a specified time period, after which the crystallized zeolite is separated from the reaction medium by any suitable technique, e. g., filtration.

The relative amounts of the components in the systems are such that in the reaction mixture the silica to alumina molar ratio will be in the range of about 2:1 to about 3.0:1, and preferably will be in the range of about 2.25:1 to about 2.4:1; the sodium oxide to silica molar ratio will be in the range of about 1.2:1 to about 2.5:1, and preferably will be in the range of about 1.6:1 to about 1.9:1; and the water to sodium oxide molar ratio will be greater than 35:1 and preferably will be at least about 60:1.

The reaction mixture is then subjected to crystallization in suitable containers, for example, mild steel or stainless steel tanks or polymer-lined vessels, at temperatures less than 70° C., for example, temperatures in the range of at least about 50° C., but less than 70° C. Crystallization temperatures higher than about 70° C. are avoided because such higher temperatures promote the formation of type A zeolite at low silica-to-alumina molar ratios. Preferably, the crystallization is carried out at a temperature in the range of about 50 to about 65° C. It is most preferred to conduct the crystallization at a temperature near about 60° C., for example, at a temperature in the range of about 55 to about 65° C., because crystallization temperatures in this range promote more rapid crystallization than lower temperatures, while at the same time providing better direction of the crystallization toward formation of type X rather than type A zeolite. Optionally, the reaction mixture may be continuously or intermittently agitated.

A preferred method of making the hydrogel mixture comprises separately forming sodium aluminate and sodium silicate aqueous solutions, preferably using deionized water.

A preferred method of making NaLSX according to the method of the invention comprises the following steps: First, an aqueous sodium aluminate solution is prepared by uniformly dispersing sodium aluminate powder in deionized water and mixing the resulting suspension with a solution of sodium hydroxide. Secondly, an aqueous sodium silicate solution is diluted with deionized water. The sodium aluminate solution and the sodium silicate solution are then rapidly mixed with sufficient agitation to produce a uniform mixture. The mixing process is preferably carried out at a temperature in the range of about 5 to about 60° C., and is more preferably carried out at a temperature in the range of about 20 to about 30° C. The mixing step is generally carried out for a period of up to about 1 hour. The mixture forms a hydrogel. The hydrogel is stirred until homogeneous (about 30 minutes), and it is then transferred into crystallization vessels, e. g., mild steel or stainless steel tanks or polymer-lined vessels. Hydrothermal crystallization is statically carried out at autogeneous pressure for a period of about 1 to about 10 days at a temperature in the range of about ambient to about 65° C. The reaction mixture may optionally be stirred intermittently or continuously. Finally, the solid product is separated from the mother liquor by, for example, filtration. The product is washed with water (preferably deionized water) or an aqueous solution of about 0.01 N sodium hydroxide solution, and dried at a temperature in the range of about ambient temperature to about 150° C.

The zeolite product of this invention generally has a primary particle dimension in the range of about 0.1 to about 10 microns and in preferred embodiments of the invention it has a primary particle dimension in the range of about 0.1 to about 4 microns. For purposes of this invention, "primary particle dimension" is defined as the diameter characteristic of the size of a sphere circumscribing the averaged-size particle of the as-synthesized powder product.

If desired, the zeolites produced by the method of the invention can be made into pellets by, for example, compaction in a die (without a binder) followed by crushing and sieving to the desired size. When the zeolites of the present invention are to be used in industrial adsorbers, it may be preferred to aggregate the zeolite with binders to control the column fluid dynamics and macropore diffusion within the aggregates. Those skilled in molecular sieve technology are aware of conventional techniques for aggregating molecular sieves. Such techniques usually involve mixing the molecular sieve with a binder and shaping the mixture into aggregate particles, by, for example, extrusion or bead formation. The resulting "green" shaped aggregate particles are dried and cured, i. e., calcined, to set the binder and harden the particles so that they are more crush-resistant. This is accomplished by heating the shaped particles to a temperature in the range of about 400 to about 800° C., and preferably to a temperature in the range of about 500 to about 800° C.

The binder used in the aggregation step can be any of the many binders that are available and that will not significantly interfere with the desired use of the zeolite as a gas adsorbent. Binders suitable for aggregating the zeolites include the various clays, silicas, aluminas, metal oxides and mixtures thereof, for example, binary compositions such as silica-alumina, silica-magnesia, silica-zirconia, silica-thoria, silica-beryllia, and silica-titania, and ternary compositions, such as silica-alumina-thoria, silica-alumina-zirconia. The particular binder used in the invention is not critical and any of the above or other binders can be used in the process of the invention. Clay is a preferred binder because of its low cost and ready availability. Other additives may be used to control the rheology of the mixture during the aggregation step and/or the porosity of the final activated product.

The relative proportions of zeolite and binder may vary over a wide range. In general, the aggregate generally comprises about 65to about 99% zeolite and about 35 to about 1% binder, and it preferably comprises about 80 to about 96% zeolite and about 20 to about 4% by weight binder (weight % on a dry basis). Where the zeolite is to be formed into aggregates prior to use, such aggregates are desirably about 0.5 to about 5 mm in diameter.

If it is desired to produce other LSX zeolite compositions, the NaLSX product can be cation-exchanged by contacting it with sources of other cations, including bases, such as $Ca(OH)_2$, LiOH, KOH, and salts, such as $CaCl_2$, LiCl, lithium acetate, etc., at a temperature in the range of, for example, about 25 to about 150° C. The ion-exchange step can be carried out before or after agglomeration of the zeolite powder by any of the well-known procedures. A typical procedure comprises contacting the zeolite powder (before or after drying) or the calcined aggregate particles with an aqueous base or salt solution of the desired ions at a temperature in the range of, for example, about ambient to about 100° C. This results in the replacement of at least part of the sodium ions initially on the zeolite with the selected ion or ions. The ion-exchanged particles can be activated by heating them to a temperature of about 400 to about 800° C., but most preferably to a temperature in the range of 450 to 600° C.

The NaLSX and NaMSX products of the invention can be used in various industrial applications, such as adsorptive gas purification or gas separation. An adsorption application to which the products of the invention are well adapted is the prepurification of air by temperature swing adsorption (TSA) prior to introducing the air into an air separation unit such as a cryogenic distillation column. The zeolites of the invention are particularly suitable for such processes because of their high adsorption capacity, low price and superior thermal stability. In such processes, the zeolite can be used as a single layer or it can be used as a downstream layer in combination with other adsorbents, for example, alumina. The alumina serves to remove water vapor from the air, and the NaLSX or NaMSX removes carbon dioxide from the air. Such TSA processes are generally cyclical and comprise at least an adsorption step and an adsorbent regeneration step, with the adsorption step being carried out at a temperature in the range of about 5 to about 50° C. and the adsorbent regeneration step being carried out at a temperature in the range of about 100 to about 250° C.

As indicated above, the zeolites produced by the process of this invention can be used to purify gases, or to separate two or more gases, one of which is more strongly adsorbed by the adsorbents of the invention than the other gas(es), under either conditions of equilibrium or non-equilibrium, i. e., in the kinetic regime of a process. The zeolites are particularly suitable for the separation of nitrogen or nitrogen and argon from oxygen, the separation of carbon dioxide, dinitrogen oxide or trace amounts of gaseous hydrocarbons from air; and the separation of hydrocarbons, for example, alkenes, such as ethylene, propylene, etc., from alkanes, such as ethane, propane, etc.

It will be appreciated that it is within the scope of the present invention to utilize conventional equipment to monitor and automatically regulate the synthesis method of the invention so that it can be fully automated to run continuously in an efficient manner.

The invention is further illustrated by the following examples, in which, unless otherwise indicated, parts, percentages and ratios are on a mole basis.

The zeolite powder samples made in the examples were characterized by X-ray powder diffraction (XRD) on a Philips APD 3600/2 diffractometer for crystallinity and phase identification. The apparent crystallinity was determined from the sum of the areas under five intense peaks with 2 theta values of 15.4, 23.3, 26.6, 32 and 37.3, relative to the sum of the same peaks for highly crystalline standard sodium zeolite X. Scanning Electron Microscopy (SEM) on a Hitachi S-520 Microscope was used to determine the morphology and crystal size of the samples. Inductively Coupled Plasma Emission Spectrometry (ICP) using an ARL-3510 Sequential ICP Spectrometer was used for the determination of the bulk chemical composition.

EXAMPLES 1–6 (COMPARATIVE)

The zeolites of these examples were made by the procedure described by Tatic et al., for the production of LSX zeolite. The raw materials used in the examples were, on a weight percentage basis: sodium aluminate, (57% $Al_2O_3$ and 40.2% $Na_2O$); sodium silicate, (29.8% $SiO_2$ and 8.8% $Na_2O$); sodium hydroxide; and deionized water. In each example, the sodium hydroxide was fully dissolved in deionized water, and sodium aluminate was added to the resulting solution. Sodium silicate was separately mixed with deionized water, and the mixture added rapidly to the sodium aluminate solution, thereby causing the formation of a hydrogel. The hydrogel $SiO_2/Al_2O_3$, $Na_2O/SiO_2$, $OH/SiO_2$ and $H_2O/Na_2O$ mole ratios of each of the examples were 2.5, 1.5, 3.0 and 70, respectively. The hydrogel of each sample was stirred for about 30 minutes to produce a homogeneous mixture, and the mixture was then transferred into 150 ml polypropylene bottles, and the bottles were sealed. The sealed bottles were placed in a convection oven, and hydrothermal crystallization of each sample was carried out statically at autogeneous pressure and at the reaction temperature specified in Table 1. Samples were periodically withdrawn during the course of crystallization. After completion of the crystallization, the white solid product was recovered by vacuum filtration, washed with aqueous 0.01 N NaOH solution and air dried overnight at ambient temperature. The samples were then rehydrated to their equilibrium water capacity by storing over a saturated aqueous sodium chloride solution. Crystallization conditions, product identity, as determined by XRD, and bulk chemical composition of the products are summarized in Table 1.

TABLE 1

| | Crystallization Time, hr:min | | | % Crystallinity | | | |
|---|---|---|---|---|---|---|---|
| Example | at 55° C. | at 60° C. | at 100° C. | Zeolite X | Zeolite A | Si/Al | Na/Al |
| 1 | 4:26 | 0:00 | 20:15 | 89 | 11 | 1.19 | 1.01 |
| 2 | 24:00 | 0:00 | 9:00 | 61 | 3 | n/a | n/a |
| 3 | 0:00 | 21:00 | 3:00 | 0 | 0 | — | — |
| 4 | 0:00 | 21:00 | 9:45 | 48 | 1 | 1.20 | 1.03 |
| 5 | 0:00 | 21:00 | 28:07 | 94 | 5 | 1.18 | 1.00 |
| 6 | 0:00 | 118:37 | 5:02 | 100 | 0 | 1.17 | 0.99 |

The XRD patterns of the products made in the above examples are consistent with that of the faujasite structure. In some cases, a significant amount of zeolite A was also present. The Si/Al atomic ratios of the products made in these examples were between 1.1 and 1.2, showing that the method described by Tatic et al. for the preparation of LSX, produced MSX rather than LSX.

EXAMPLES 7–12 (COMPARATIVE)

Procedure of Examples 1–6 was repeated except that the $OH/SiO_2$ ratio mixtures was changed. The hydrogel $SiO_2/Al_2O_3$, $Na_2O/SiO_2$, $OH/SiO_2$ and $H_2O/Na_2O$ mole ratios of each of the examples were 2.5, 1.75, 3.5 and 70, respectively. The crystallization conditions, the XRD product identity and the product bulk chemical compositions are summarized in Table 2.

TABLE 2

| | Crystallization Time, hr:min | | | % Crystallinity | | | |
|---|---|---|---|---|---|---|---|
| Example | at 55° C. | at 60° C. | at 100° C. | Zeolite X | Zeolite A | Si/Al | Na/Al |
| 7 | 4:26 | 0:00 | 20:15 | 81 | 21 | 1.18 | 1.02 |
| 8 | 24:00 | 0:00 | 7:15 | 96 | 4 | 1.17 | 1.00 |
| 9 | 0:00 | 21:00 | 3:00 | 0 | 0 | — | — |
| 10 | 0:00 | 21:00 | 7:00 | 68 | 10 | 1.19 | 1.01 |
| 11 | 0:00 | 21:00 | 9:45 | 91 | 10 | 1.19 | 1.04 |
| 12 | 0:00 | 117:26 | 0:00 | 100 | 0 | 1.13 | 1.01 |

The XRD patterns of these samples are consistent with that of the faujasite structure. In most cases, a significant amount of zeolite A was also present. The Si/Al atomic ratios of these products were between 1.1 and 1.2.

EXAMPLES 13–24 (COMPARATIVE)

The procedure of Examples 1–6 was repeated except that the silica source was varied as follows: In Examples 13–16, the silica source was sodium meta-silicate pentahydrate; in Examples 17–20, it was aqueous sodium silicate solution; and in Examples 21–24, it was sodium meta-silicate non-ahydrate. The $SiO_2/Al_2O_3$, $Na_2O/SiO_2$, $OH/SiO_2$ and $H_2O/Na_2O$ mole ratios of the hydrogels prepared in Examples 13–16 were 2.74, 1.59, 3.19 and 70, respectively; the $SiO_2/Al_2O_3$, $Na_2O/SiO_2$, $OH/SiO_2$ and $H_2O/Na_2O$ mole ratios of the hydrogels prepared in Examples 17–20 were 2.74, 1.59, 3.19, 3.5 and 70, respectively; the $SiO_2/Al_2O_3$, $Na_2O/SiO_2$, $OH/SiO_2$ and $H_2O/Na_2O$ mole ratios of the hydrogels prepared in Examples 21 and 22 were 2.5, 1.60, 3.20 and 70, respectively; and the $SiO_2/Al_2O_3$, $Na_2O/SiO_2$, $OH/SiO_2$ and $H_2O/Na_2O$ mole ratios of the hydrogels prepared in Examples 23 and 24 were 2.5, 1.75, 3.5 and 70, respectively. The crystallization conditions, XRD product identity and the bulk chemical compositions are summarized in Table 3.

TABLE 3

| Example | Crystallization Time, (hr:min) at 60° C. | at 100° C. | % Crystallinity Zeolite X | Zeolite A | Si/Al | Na/Al |
|---|---|---|---|---|---|---|
| 13 | 16:35 | 0:00 | 96 |  | 1.14 | 1.01 |
| 14 | 24:00 | 0:00 | 97 |  | n/a | n/a |
| 15 | 42:10 | 0:00 | 98 |  | 1.16 | 0.99 |
| 16 | 22:00 | 2:30 | 96 |  | 1.14 | 1.03 |
| 17 | 16:35 | 0:00 | 0 |  | — | — |
| 18 | 112:12 | 0:00 | 100 |  | 1.16 | 1.01 |
| 19 | 88:32 | 5:00 | 100 |  | 1.16 | 1.01 |
| 20 | 88:32 | 0:00 | 101 |  | n/a | n/a |
| 21 | 24:00 | 16:53 | 96 |  | 1.12 | 1.01 |
| 22 | 24:00 | 24:00 | 97 |  | 1.12 | 1.03 |
| 23 | 24:00 | 16:53 | 96 |  | 1.10 | 1.02 |
| 24 | 24:00 | 24:00 | 96 |  | 1.11 | 1.02 |

The XRD patterns of the products made in these examples are consistent with that of the faujasite structure. The products had Si/Al atomic ratios between 1.1 and 1.2, i. e., the method of these examples produces MSX rather than LSX.

EXAMPLES 25–30 (COMPARATIVE)

The procedure of Examples 1–6 was repeated except that the silica source was sodium meta-silicate pentahydrate. The $SiO_2/Al_2O_3$, $Na_2O/SiO_2$, $OH/SiO_2$ and $H_2O/Na_2O$ mole ratios of the hydrogels prepared in Examples 25–27 were 2.63, 1.60, 3.20 and 70, respectively; and the $SiO_2/Al_2O_3$, $Na_2O/SiO_2$, $OH/SiO_2$ and $H_2O/Na_2O$ mole ratios of the hydrogels prepared in Examples 28–30 were 2.64, 1.60, 3.20, and 70, respectively. The crystallization conditions, XRD product identity and the product bulk chemical compositions for these examples are summarized in Table 4.

TABLE 4

| Example | Crystallization Time, hr:min at 60° C. | at 100° C. | % Crystallinity Zeolite X | Zeolite A | Si/Al | Na/Al |
|---|---|---|---|---|---|---|
| 25 | 24:00 | 0:00 | 95 |  | n/a | n/a |
| 26 | 24:00 | 6:00 | 96 |  | 1.13 | 1.00 |
| 27 | 30:12 | 0:00 | 96 |  | 1.14 | 1.00 |
| 28 | 24:00 | 0:00 | 0 |  | — | — |
| 29 | 24:00 | 19:00 | 99 |  | 1.19 | 1.00 |
| 30 | 52:31 | 14:33 | 101 |  | 1.19 | 1.00 |

The XRD patterns are consistent with that of the faujasite structure. The Si/Al atomic ratios of the products were between 1.1 and 1.2, i. e., the method of these examples produced MSX rather than LSX.

EXAMPLES 31–40

A combination of different synthesis variables was combined with using the preparatory procedure described for Examples 1–6. In each example, sodium meta-silicate pentahydrate was used as the silica source. The $SiO_2/Al_2O_3$, $Na_2O/SiO_2$, $OH/SiO_2$ and $H_2O/Na_2O$ mole ratios of the hydrogels prepared in; Examples 31–35 were 2.29, 1.79, 3.58 and 70, respectively; and the $SiO_2/Al_2O_3$, $Na_2O/SiO_2$, $OH/SiO_2$ and $H_2O/Na_2O$ mole ratios of the hydrogels prepared in Examples 36–40 were 2.29, 1.84, 3.68, and 70, respectively. Table 5 shows the crystallization conditions, XRD product identity and the product bulk chemical compositions for these examples.

TABLE 5

| Example | Crystallization Time, hr:min at 60° C. | at 100° C. | % Crystallinity Zeolite X | Zeolite A | Si/Al | Na/Al |
|---|---|---|---|---|---|---|
| 31 | 24:00 | 0:00 | 32 | 2 | n/a | n/a |
| 32 | 40:51 | 0:00 | 91 | 7 | 1.05 | 0.98 |
| 33 | 49:00 | 0:00 | 91 | 6 | 1.06 | 0.99 |
| 34 | 0:00 | 24:00 | 64 | 30 | 1.06 | 1.00 |
| 35 | 0:00 | 40:51 | 69 | 29 | 1.06 | 1.01 |
| 36 | 24:00 | 0:00 | 34 | 0 | n/a | n/a |
| 37 | 40:51 | 0:00 | 94 | 4 | 1.07 | 1.01 |
| 38 | 49:00 | 0:00 | 94 | 4 | 1.08 | 1.01 |
| 39 | 0:00 | 24:00 | 74 | 23 | 1.06 | 1.02 |
| 40 | 0:00 | 40:51 | 76 | 23 | 1.08 | 1.02 |

The XRD patterns of the products made in these examples are consistent with that of the faujasite structure. In all cases, the Si/Al atomic ratio of the products was between 1.05 and 1.08. Note that in Examples 31–33, 37 and 38, in which the temperature was maintained at 60° C. during the entire crystallization period, very little type A zeolite by-product was synthesized, while in examples 34, 35, 39 and 40, in which the crystallization temperature was maintained at 100° C. during the entire crystallization period, significant amounts of type A zeolite by-product were produced. These examples clearly demonstrate that NaLSX zeolite can be prepared directly by the method of the invention by maintaining the crystallization temperature at 60° C.

EXAMPLES 41–64

The procedure of Examples 1–6 was repeated using a combination of different synthesis variables. In each example, the crystallization temperature was 60° C., and sodium meta-silicate pentahydrate was used as the silica source. The $SiO_2/Al_2O_3$, $Na_2O/SiO_2$, $OH/SiO_2$ and $H_2O/Na_2O$ mole ratios of the hydrogels prepared in Examples 41–48 were 2.34, 1.84, 3.69 and 70.0 respectively; and the $SiO_2/Al_2O_3$, $Na_2O/SiO_2$, $OH/SiO_2$ and $H_2O/Na_2O$ mole ratios of the hydrogels prepared in Examples 49–64 were 2.31, 1.84, 3.69, and 70, respectively. In Examples 45–48, 53–56 and 61–64, the mixture was seeded with NaLSX powder having a Si/Al atomic ratio of 1.0. Table 6 shows the crystallization conditions, the XRD product identity and the product bulk chemical compositions.

TABLE 6

| Example | Crystallization Time at 60° C., (hr) | % Crystallinity Zeolite X | Zeolite A | Si/Al | Na/Al |
|---|---|---|---|---|---|
| 41 | 72:00 | 97 | 2 | 1.08 | 1.01 |
| 42 | 94:00 | 98 | 2 | 1.08 | 1.02 |
| 43 | 102:12 | 97 | 3 | 1.07 | 1.02 |
| 44 | 118:00 | 97 | 2 | 1.06 | 1.01 |
| 45 | 72:00 | 96 | 2 | 1.07 | 1.01 |
| 46 | 94:00 | 97 | 1 | 1.07 | 1.01 |
| 47 | 102:12 | 96 | 2 | 1.06 | 1.01 |
| 48 | 118:00 | 96 | 1 | 1.07 | 1.03 |
| 49 | 72:00 | 94 | 5 | 1.05 | 1.00 |
| 50 | 78:04 | 94 | 6 | 1.06 | 1.01 |
| 51 | 102:12 | 95 | 6 | 1.06 | 1.01 |
| 52 | 118:00 | 95 | 5 | 1.06 | 1.01 |
| 53 | 72:00 | 93 | 6 | 1.07 | 1.02 |
| 54 | 94:00 | 94 | 6 | 1.07 | 1.02 |
| 55 | 102:12 | 93 | 6 | 1.08 | 1.02 |
| 56 | 118:00 | 92 | 6 | 1.08 | 1.02 |
| 57 | 54:00 | 72 | 5 | 1.09 | 1.04 |

TABLE 6-continued

| | Crystallization Time | % Crystallinity | | | |
|---|---|---|---|---|---|
| Example | at 60° C., (hr) | Zeolite X | Zeolite A | Si/Al | Na/Al |
| 58 | 71:00 | 93 | 6 | 1.07 | 1.00 |
| 59 | 97:12 | 95 | 6 | 1.08 | 0.99 |
| 60 | 118:04 | 95 | 6 | 1.07 | 1.00 |
| 61 | 45:50 | 93 | 5 | 1.06 | 1.01 |
| 62 | 54:00 | 94 | 3 | 1.08 | 1.00 |
| 63 | 71:00 | 93 | 5 | 1.07 | 1.00 |
| 64 | 97:12 | 94 | 4 | 1.07 | 1.01 |

Table 6 demonstrates the preparation of NaLSX by varying the starting gel composition and using sodium meta-silicate pentahydrate as the silica source. The XRD patterns of the products made in these examples are consistent with that of the faujasite structure. The Si/Al atomic ratio of the products in each of these examples was between 1.05 and 1.08. Seeding of the reaction mixture with NaLSX powder made by the Na—K route did not appear to affect the bulk chemical composition of the products.

EXAMPLES 65–84

In Examples 65–84, the water content and crystallization times were varied, while the gel composition was kept constant. In each example, sodium meta-silicate pentahydrate was used as the silica source. Table 7 shows the crystallization conditions, the XRD product identity and the bulk chemical composition for each final product.

TABLE 7

| | | | % Crystallinity | | | |
|---|---|---|---|---|---|---|
| Example | $H_2O/Na_2O$ | Crystallization Time at 60° C., hr:min | Zeolite X | Zeolite A | Si/Al | Na/Al |
| 65 | 35.267 | 24:30 | 16 | 70 | n/a | n/a |
| 66 | " | 160:08 | 21 | 66 | n/a | n/a |
| 67 | " | 211:35 | 22 | 64 | n/a | n/a |
| 68 | 50.000 | 24:30 | 77 | 19 | n/a | n/a |
| 69 | " | 48:00 | 81 | 17 | n/a | n/a |
| 70 | " | 72:00 | 82 | 14 | n/a | n/a |
| 71 | " | 160:08 | 90 | 8 | n/a | n/a |
| 72 | 60.000 | 24:30 | 13 | 0 | n/a | n/a |
| 73 | " | 48:00 | 93 | 7 | 1.07 | 1.02 |
| 74 | " | 72:00 | 94 | 6 | 1.07 | 1.04 |
| 75 | " | 88:00 | 95 | 6 | 1.07 | 1.01 |
| 76 | 65.000 | 75:31 | 98 | 2 | 1.07 | 0.99 |
| 77 | " | 90:15 | 98 | 2 | 1.07 | 1.01 |
| 78 | " | 114:14 | 97 | 1 | 1.08 | 1.01 |
| 79 | " | 138:25 | 98 | 1 | 1.07 | 1.01 |
| 80 | 75.000 | 73:00 | 86 | 1 | 1.09 | 1.00 |
| 81 | " | 95:54 | 99 | 1 | 1.08 | 1.00 |
| 82 | " | 136:55 | 98 | 1 | 1.08 | 1.00 |
| 83 | " | 161:18 | 99 | 1 | 1.09 | 1.00 |
| 84 | " | 168:50 | 99 | 2 | 1.08 | 1.01 |

These examples illustrate that maintaining the $H_2O/Na_2O$ mole ratio at or above 65 minimizes the amount of co-crystallization of type A zeolite. The Si/Al atomic ratios of the products made in these examples were between 1.05 and 1.08. In Examples 68–74, the mixtures were seeded with NaLSX power having a Si/Al atomic ratio of 1.0. Seeding appears not to affect the bulk composition of the final products.

EXAMPLES 85–96

In each of these examples, the $H_2O/Na_2O$ mole ratio was 65, and the crystallization was carried out at 60° C. Sodium meta-silicate pentahydrate was used as the silica source. The $SiO_2/Al_2O_3$, $Na_2O/SiO_2$, $OH/SiO_2$ and $H_2O/Na_2O$ mole ratios of the starting materials for syntheses in accordance with these examples were 2.31, 1.80, 3.60 and 65.00, respectively. Table 8 shows the crystallization conditions, the XRD product identity and the bulk chemical compositions of the final products made in these examples. The Si/Al atomic ratio of the products made in each of these examples was between 1.05 and 1.09.

TABLE 8

| | Crystallization Time | % Crystallinity | | | |
|---|---|---|---|---|---|
| Example | at 60° C. (hr) | Zeolite X | Zeolite A | Si/Al | Na/Al |
| 85 | 52:40 | 94 | 0 | 1.09 | 1.00 |
| 86 | 69:30 | 100 | 1 | 1.08 | 1.01 |
| 87 | 117:00 | 101 | 1 | 1.08 | 1.02 |
| 88 | 125:08 | 100 | 0 | 1.08 | 1.01 |
| 89 | 141:05 | 100 | 1 | 1.08 | 1.00 |
| 90 | 149:18 | 100 | 0 | 1.08 | 0.99 |
| 91 | 53:00 | 90 | 0 | 1.08 | 1.00 |
| 92 | 69:10 | 97 | 1 | 1.07 | 0.99 |
| 93 | 76:00 | 98 | 1 | 1.07 | 0.98 |
| 94 | 141:10 | 99 | 0 | 1.08 | 1.00 |
| 95 | 149:20 | 98 | 1 | 1.08 | 1.02 |
| 96 | 165:25 | 99 | 1 | 1.08 | 0.98 |

These examples show that crystallization of high purity NaLSX zeolite is achieved when substantially the entire crystallization is carried out at 60° C. and at a $H_2O/Na_2O$ mole ratios of at least 65.

EXAMPLES 97, 98

Equilibrium adsorption isotherms for carbon dioxide were measured using a VTI microbalance at a series of pressures in the range of about 0.01 to about 38 torr at 25° C. for the NaLSX samples prepared in Examples 46 (illustrated in the FIGURE by square symbols) and 76 (illustrated in the FIGURE by circle symbols). Each sample of adsorbent (about 100 mg) was activated in situ by evacuation at 350° C. and $10^{-5}$ torr for 1.5 hours. Each test was conducted until adsorption equilibrium was achieved.

The drawing FIGURE shows that adsorbents prepared in accordance with the zeolite manufacturing process of the invention have excellent carbon dioxide uptake for all partial pressure values in the tested range.

EXAMPLE 99

A lithium- and rare earth (RE) cation-exchanged zeolite sample was prepared by ion-exchanging a zeolite prepared in a manner similar to the procedure of Example 78 with a commercial mixed rare-earth-metal chloride solution (composition: approximately 67% $LaCl_3$, 23% $NdCl_3$, 9% $PrCl_3$ and 1% $CeCl_3$) and with lithium chloride.

The rare-earth mixture ion-exchange was performed on powdered samples using a 0.02 M rare-earth metal chloride solution containing the required quantity of trivalent cations. This ion-exchange was carried out under static conditions at ambient temperature, after which the zeolite was washed with deionized water and dried at room temperature. Subsequently, the lithium ion-exchange was carried out on the resulting sample by five static exchange steps with 0.5 M lithium chloride solution (adjusted to a pH value of 9 by means of concentrated LiOH solution), and each exchange solution containing five-fold excesses of lithium ions over the quantity of the base cations remaining after rare-earth-cation exchange. The exchange procedures were carried out at 79° C. for about 16 to 20 hours. The final lithium-rare-earth cation exchanged sample was washed with a large volume of deionized water and dried at ambient temperature overnight. The analysis of the dried powder by Inductively Coupled Plasma Atomic Emission spectroscopy (ICP-AES) using a Perkin Elmer Optima 3000 ICP Spectrometer, gave the following equivalent ratios: (Na+K)/Al=0.028, Li/Al= 0.86 and RE/Al=0.128.

Adsorption isotherms for nitrogen ($N_2$) and oxygen ($O_2$) on the rare earth-and lithium-exchanged zeolite were measured gravimetrically using a Cahn 2000 Series microbalance enclosed in a stainless steel vacuum/pressure system. Pressure measurements in the range 1–10000 mbar were made using a MKS Baratron system. About 100 mg of the sample was carefully evacuated and its temperature increased to 500° C. at a rate of 1–2° C. per minute. The adsorption isotherms for nitrogen and oxygen were measured at 25° C. in the pressure range 50–6800 mbar for nitrogen, and 25–2000 mbar for oxygen, and the data were fitted to a single or multiple site Langmuir isotherm model. The fits to the nitrogen data were used to calculate the nitrogen capacities of the samples at 1 atmosphere of equilibrium pressure, and their effective adsorption capacities for nitrogen over a given pressure range, at 25° C. The effective nitrogen adsorption capacity is defined as the difference between the nitrogen capacity at 1250 mbar and that at 250 mbar. This parameter gives a good indication of the adsorption capacity of the zeolite in a PSA process operated between upper and lower pressures in this range. The adsorption selectivities of the samples for nitrogen over oxygen in air at 1500 mbar and 25° C. were derived from the pure gas isotherms for nitrogen and oxygen using Langmuir mixing rules (Ref. e.g. A. L. Myers: AIChE-J.: 29(4), (1983), pp. 691–693). The usual definition for adsorption selectivity was used, where the selectivity (S) is given by:

$$S=(x_{N2}/y_{N2})/(x_{O2}/y_{O2}),$$

where $x_{N2}$ and $x_{O2}$ are the mole fractions of nitrogen and oxygen, respectively, in the adsorbed phase, and $y_{N2}$ and $y_{O2}$ are the mole fractions of nitrogen and oxygen, respectively, in the gas phase.

The adsorption results for the trivalent ion, lithium LSX sample of Example 99 are given in Table 9.

TABLE 9

| Example No. | $N_2$ Uptake at 1 atm, mmol/g | Effective $N_2$ Uptake (1,250–250) mbar mmol/g | $N_2/O_2$ Selectivity 1,500 mbar (air) |
|---|---|---|---|
| 99 | 1.07 | 0.77 | 9.2 |

Although the invention has been described with particular reference to specific equipment arrangements and to a specific experiment, these features are merely exemplary of the invention and variations are contemplated. The scope of the invention is limited only by the breadth of the appended claims.

What is claimed is:

1. A method of producing sodium X zeolite comprising the steps:
   (a) forming a uniform, substantially potassium ion-free, aqueous reaction mixture comprising silica, alumina and sodium ions, the concentrations of the components in said reaction mixture being such that the silica/alumina molar ratio is in the range of about 2.1:1 to about 2.5:1; the $OH^-/SiO_2$ molar ratio is in the range of about 3 to about 3.69; and the water/sodium oxide molar ratio is about 35 to about 70;
   (b) maintaining said reaction mixture at a temperature less than about 70° C. until crystallization of the mixture is substantially complete; and
   (c) recovering crystallized sodium X zeolite having a Si/Al atomic ratio in the range of about 1.0 to about 1.1 from said reaction mixture.

2. The method of claim 1, wherein at least 80% by weight of said crystallized sodium X zeolite has a primary particle dimension in the range of about 0.1 to about 10 microns.

3. The method of claim 1, wherein during step (b) said reaction mixture is maintained at a temperature in the range of about 50 to less than 70° C.

4. The method of claim 3, wherein said silica/alumina molar ratio is in the range of about 2.25:1 to about 2.4:1, said $OH^-/SiO_2$ molar ratio is in the range of about 3.4:1 to about 3.8:1 and said water/sodium oxide molar ratio is at least about 60:1.

5. The method of claim 4, wherein said reaction mixture is formed by mixing a first aqueous mixture comprising alumina and a second aqueous mixture comprising silica.

6. The method of claim 5, wherein said crystallized sodium X zeolite has a Si/Al atomic ratio in the range of about 1.03 to about 1.08.

7. The method of claim 6, wherein said first aqueous mixture is an aqueous solution comprising sodium aluminate and said second aqueous mixture is an aqueous solution comprising sodium silicate, sodium meta-silicate or mixtures thereof.

8. The method of claim 6, wherein during step (b) said reaction mixture is maintained at a temperature in the range of about 55 to about 65° C.

9. The method of claim 8, wherein said aqueous reaction mixture is vigorously agitated during step (b).

10. The method of claim 8, wherein said first aqueous solution is formed by dispersing sodium aluminate in water and adding sodium hydroxide thereto.

11. The method of claim 8, further comprising drying the recovered crystallized sodium X zeolite at a temperature in the range of ambient temperature to about 150° C.

12. The method of claim 8, further comprising ion-exchanging said crystallized sodium X zeolite with monovalent cations, divalent cations, trivalent cations or mixtures thereof.

13. The method of claim 12, wherein said crystallized sodium X zeolite is ion-exchanged with lithium ions, calcium ions, rare earth cations or mixtures thereof.

* * * * *